US011011184B2

(12) United States Patent
Chaudhuri et al.

(10) Patent No.: US 11,011,184 B2
(45) Date of Patent: *May 18, 2021

(54) AUTOMATIC DETERMINATION OF TIMING WINDOWS FOR SPEECH CAPTIONS IN AN AUDIO STREAM

(71) Applicant: GOOGLE LLC, Mountain View, CA (US)

(72) Inventors: Sourish Chaudhuri, San Francisco, CA (US); Nebojsa Ciric, Mountain View, CA (US); Khiem Pham, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/685,187

(22) Filed: Nov. 15, 2019

(65) Prior Publication Data

US 2020/0090678 A1  Mar. 19, 2020

Related U.S. Application Data

(63) Continuation of application No. 15/225,513, filed on Aug. 1, 2016, now Pat. No. 10,490,209.

(60) Provisional application No. 62/330,836, filed on May 2, 2016.

(51) Int. Cl.
| | | |
|---|---|---|
| *G10L 21/00* | (2013.01) | |
| *G10L 25/27* | (2013.01) | |
| *G11B 27/28* | (2006.01) | |
| *G10L 25/87* | (2013.01) | |
| *G10L 25/48* | (2013.01) | |
| *G10L 19/022* | (2013.01) | |
| *G10L 25/93* | (2013.01) | |

(52) U.S. Cl.
CPC ............ *G10L 25/27* (2013.01); *G10L 19/022* (2013.01); *G10L 25/48* (2013.01); *G10L 25/87* (2013.01); *G10L 25/93* (2013.01); *G11B 27/28* (2013.01)

(58) Field of Classification Search
None
See application file for complete search history.

(56) References Cited

U.S. PATENT DOCUMENTS

| | | |
|---|---|---|
| 8,548,803 B2 | 10/2013 | Bradley et al. |
| 9,589,564 B2 | 3/2017 | Sharifi |
| 10,037,313 B2 | 7/2018 | Wang et al. |

(Continued)

OTHER PUBLICATIONS

International Search Report and Written Opinion for Application No. PCT/US2016/069262, dated Apr. 24, 2017, 14 pages.

(Continued)

*Primary Examiner* — Satwant K Singh
(74) *Attorney, Agent, or Firm* — Lowenstein Sandler LLP

(57) ABSTRACT

The technology disclosed herein may determine timing windows for speech captions of an audio stream. In one example, the technology may involve accessing audio data comprising a plurality of segments; determining, by a processing device, that one or more of the plurality of segments comprise speech sounds; identifying a time duration for the speech sounds; and providing a user interface element corresponding to the time duration for the speech sounds, wherein the user interface element indicates an estimate of a beginning and ending of the speech sounds and is configured to receive caption text associated with the speech sounds of the audio data.

20 Claims, 8 Drawing Sheets

(56) References Cited

U.S. PATENT DOCUMENTS

| | | |
|---|---|---|
| 10,490,209 B2* | 11/2019 | Chaudhuri ............ G10L 19/022 |
| 2005/0228649 A1 | 10/2005 | Harb et al. |
| 2005/0234906 A1 | 10/2005 | Ganti et al. |
| 2007/0011012 A1 | 1/2007 | Yurick et al. |
| 2007/0276656 A1* | 11/2007 | Solbach .............. G10L 19/0204 704/200.1 |
| 2011/0305384 A1* | 12/2011 | Aoyama ................ G10L 25/78 382/159 |
| 2014/0201631 A1* | 7/2014 | Pornprasitsakul ... G11B 27/031 715/716 |
| 2015/0019218 A1 | 1/2015 | Yassa et al. |
| 2015/0055013 A1 | 2/2015 | Kwon et al. |
| 2015/0066505 A1 | 3/2015 | Baker |
| 2015/0070150 A1 | 3/2015 | Levesque et al. |
| 2017/0140756 A1 | 5/2017 | Sharifi |
| 2017/0278525 A1 | 9/2017 | Wang et al. |
| 2018/0174600 A1 | 6/2018 | Chaudhuri et al. |
| 2019/0035431 A1 | 1/2019 | Attorre et al. |

OTHER PUBLICATIONS

Extended European search report for Application No. 16901159.0 dated Jul. 31, 2019, 8 pages.

* cited by examiner

AUTOMATIC DETERMINATION OF TIMING WINDOWS FOR SPEECH CAPTIONS IN AN AUDIO STREAM

CROSS REFERENCE TO RELATED APPLICATIONS

The present application is a continuation of application Ser. No. 15/225,513, filed Aug. 1, 2016, entitled "Automatic Determination of Timing Windows for Speech Captions in an Audio Stream" which claims the benefit of U.S. Provisional Application No. 62/330,836, filed on May 2, 2016, entitled "Automatic Determination of Timing Windows for Speech Captions in an Audio Stream," both of which are incorporated herein by reference in its entirety.

TECHNICAL FIELD

The disclosed embodiments relate generally to computer-implemented methods for audio captioning, and more specifically, to automatically determining the timing window of captions for speech sounds in an audio stream.

BACKGROUND

Many media content items, such as video streams or audio streams, include speech and non-speech sounds. For the speech sounds (e.g., spoken words, sung words), captions may be added to the content item so that the content may be consumed without needing to hear the audio stream of the content. A very large number (e.g., millions) of such content items may be uploaded to an online content system every day. However, not all of these content items are uploaded along with captions. While these captions may later be added by an automated speech recognition system, the accuracy of such captions if often very poor. The captions could also be added by other users (e.g., volunteers), however these volunteers may have to manually time the beginning and ending timestamps for each caption such that the caption matches the beginning and ending timestamps for the speech sounds in the content. This may be inconvenient for the users to perform, and may discourage volunteers from providing captions.

SUMMARY

In one embodiment, a computer-implemented method for automatically determining the timing windows of speech sounds is described. The method further comprises accessing an audio stream and inputting segments of the audio stream into a speech classifier for classification, the speech classifier generating, for the segments of the audio stream, raw scores representing likelihoods that the respective segment of the audio stream includes an occurrence of a speech sound. The method further comprises generating binary scores for the audio stream based on the set of raw scores, each binary score generated based on an aggregation of raw scores from consecutive series of the segments of the audio stream, and generating one or more timing windows for the speech sounds in the audio stream based on the binary scores, each timing window indicating an estimate of a beginning and ending timestamps of one or more speech sounds in the audio stream.

The features and advantages described in this summary and the following detailed description are not all-inclusive. Many additional features and advantages will be apparent to one of ordinary skill in the art in view of the drawings, specification, and claims hereof.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

I. Overview

The content system described herein provides the advantage of automatically generating timing window for captions for speech sounds in audio. The content system analyzes an audio stream of a content item and splits the audio stream into multiple segments. For each segment, the content system extracts features and generates a raw score indicating the likelihood that speech occurs in that segment. The raw score is smoothed to generate a binary score, which is in turn used to generate the timing windows for caption boxes for the content item. The timing windows indicate a start and end timestamp for speech sounds in the content item. Users, such as volunteers, may then provide caption text for these speech boxes. By generating the timing windows for the caption boxes automatically instead of requesting users to do so, the content system further incentivizes users to provide more captions for content items that have been uploaded to the content system but which do not have associated captions. Hundreds of hours of content items may be uploaded to the content system every minute, and not all this content may have associated captions. Thus, for those that are hard of hearing or unable to enable the audio stream of a content item, providing captions to these users helps them to enjoy the content items, and also provides an expanded audience for the content items.

II. System Architecture

Figure 1:
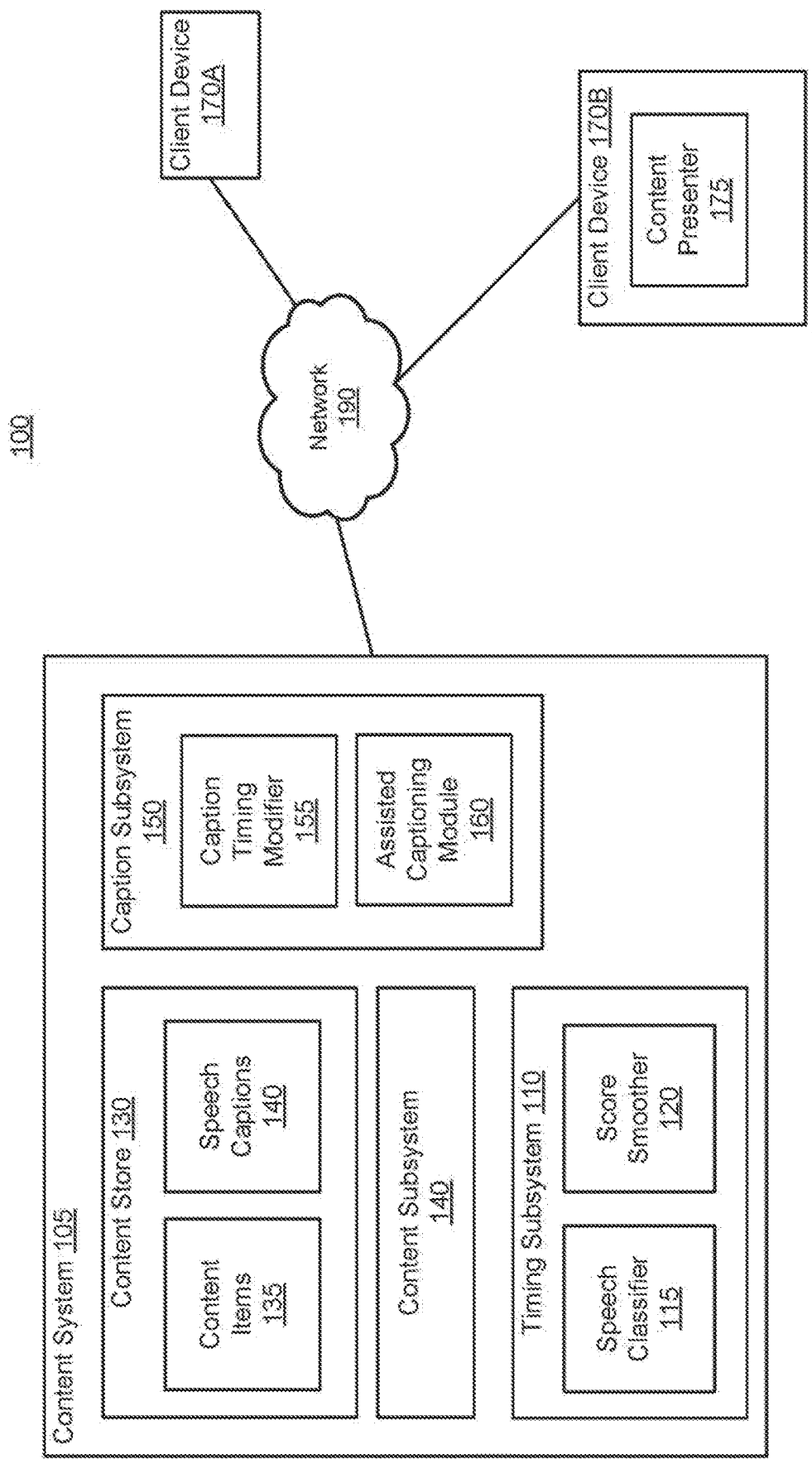
FIG. 1 is a high-level block diagram of an environment for automatic generation of timing windows for speech captioning, according to an embodiment.

FIG. 1 is a high-level block diagram of an environment 100 for automatic generation of timing windows for speech captioning, according to an embodiment. FIG. 1 illustrates a content system 105 with a content subsystem 140, a timing subsystem 110, content store 130, and caption subsystem 150. The content system 105 is connected to the network 190, which is also connected to client devices 170. While certain elements are shown in FIG. 1, in other embodiments the environment may have different elements. Furthermore, the functionalities between elements may be distributed in a different manner in other embodiments, to different or multiple modules.

Client Device and Network

The client device 170 is a computing device that may access content from the content subsystem 140. A user of the client device 170 can access a video from the content subsystem 140 by using the client device 170 to browse a catalog of content, conduct searches using keywords, review play lists from other users or the system administrator (e.g., collections of content forming channels), or view content associated with particular user groups (e.g., communities). Additionally, in some embodiments, the client device 170 may also be used to upload content to the content subsystem 140. The client device 170 may be a desktop, laptop, smart phone, tablet, wearable device, television, set top box, and the like. Although FIG. 1 illustrates only a single client device 120, it should be understood that many client devices (e.g., millions) can communicate with the video hosting system 100 at any time.

In one embodiment, the client device 170 accesses content from the content subsystem 140 and presents the content to the user via the content presenter 175. In one embodiment, the content presenter is accessed through a web browser includes a video player (e.g., an HTML5-compliant player). Furthermore, the content presenter 175 may be able to present to the user the content concurrently with captions received from the caption subsystem 150. These captions may be for speech and/or non-speech sounds in the content. The content presenter 175 may be a web browser that allows the user to view web pages and content provided by the content subsystem 140.

In one embodiment, the client device 170 may upload content items to the content system 105 (e.g., via the content presenter 175). Furthermore, a user using the client device 170 may be able to contribute caption data to content items that have already been uploaded to the content system 105. As described in further detail below, the content system 105 may provide the client device 170 with the timing windows for a content item, the timing windows indicating the start and stop timestamps of detected speech sounds in the content item. The client device 170 may display these timing windows to a user incorporated into caption boxes, allowing the user to enter in captions for the speech sounds associated with these timing windows.

Network

The network 190 represents the communication pathways between the client device 170 and the content system 105. In one embodiment, the network 190 is the Internet, but may also be any network, including but not limited to a LAN, a MAN, a WAN, a mobile, wired or wireless network, a cloud computing network, a private network, or a virtual private network, and any combination thereof. In addition, all or some of links of the network 190 can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

Content System

The content system 105 provides content items to users of the client devices 170 and also receives content uploaded from the client devices 170. The content system 105 includes a content store 130, a content subsystem 140, a timing subsystem 110, and a caption subsystem 150. The content system 105 may also include additional elements, subsystems, and servers, such as a load balancing subsystem, a content distribution network, and so on. These and other additional elements are excluded from the illustration in FIG. 1 in order to improve the ease of understanding. In addition, the functionality of each of the illustrated subsystems may be divided amongst more than one hardware device. For example, the functionality of the content subsystem 140 as described herein may be split across multiple individual servers.

Content Store

The content store 130 of the content system 105 stores content items 135. The content items 135 may include video and/or audio content items of various durations, resolutions, and so on. For example, a content item 135 may include a 4K video file, or a 360-degree video file, or a stereoscopic video file. Each content item may include an audio stream, which is an audio part of the content item (although the term "stream" is used here, it does not necessarily indicate that the audio is streaming, i.e., constantly being received by a client device 170 while being transmitted to the client device by the content system 105). The content store 130 may also store associated metadata for the content items 135, including speech captions 150 associated with the content items 135. Each content item 135 that is stored in the content store 130 may also be stored with and associated with metadata, such as a title, description, responsive comments, ratings, and soon.

The speech captions 150 include transcribed text of the speech sounds in a number of content items 135 in the content store 130. Speech sounds may include any type of audio that may be intelligible as language. This may include spoken dialogue, rhythmic spoken words, sung words, and so on. The speech sounds may include speech in multiple languages as well (i.e., not just English). In one embodiment, the speech captions 150 include multiple entries, each entry including a timing window and the text associated with the timing window. The timing window includes a start timestamp and an end timestamp, and the text includes a transcription of the speech sound present in a content item between the start timestamp and end timestamp. For example, a timing window may have a start timestamp of 00:54:12 seconds, an end timestamp of 00:54:17 and the associated text may be "A man can convince anyone he's somebody else, but never himself." Note that the text may not in all cases accurately represent the speech sounds in the corresponding segment of the content item, due to transcription, timing, or other errors. In one embodiment, a content item may also be associated with non-speech captions. The non-speech captions may also include timing windows that indicate when a non-speech sound (e.g., laughter) occurs within a content item, along with an indicator of what that non-speech sound is (e.g., "music" or an identifier, such as a number, for the non-speech sound of music).

Content Subsystem

The content subsystem 140 provides access to, viewing and listening of, and allows the uploading of the content items 135 (process not shown). The content subsystem 140 allows users to access the content items 135 in the content store 130 via searching and/or browsing interfaces. The content items 135 can be sourced from user uploads of content, from searches or crawls of other websites or databases of content, or the like, or any combination thereof. For example, in one embodiment the content subsystem 140 can be configured to allow for user uploads of content. The content subsystem 140 stores these uploaded content items in the content store 130. As another example, the content subsystem 140 may retrieve content from other content databases over the network 190.

The content subsystem 140 processes search queries received from a user. A search query may include search criteria, such as keywords that may identify videos the user is interested in viewing. The content subsystem 140 may use the search criteria, for example, to query the metadata of and/or entities associated with all the content items 135 stored in the content store 130. The search results from the query are transmitted by the content subsystem 140 to the client device 170.

The content subsystem 140 may receive content from client devices 170 (process not shown). The processing of the received content may include assigning an identification number to the newly received content. Other steps of processing the received content may include formatting (e.g., transcoding), compressing, metadata tagging, content analysis, and/or other data processing methods.

The content subsystem 140 may receive, in addition to the content, accompanying caption data. The caption data may indicate the start and end times of captions corresponding to speech (and non-speech sounds) in the content. The content may also be associated with other information, such as title, description, content type, author, ratings, and so on. The content subsystem 140 stores the content (and any associated metadata) in the content store 130.

The content subsystem 140 may serve content in a similar fashion to the YouTube™ website; other video hosting websites are known as well, and can be adapted to operate according to the teaching disclosed herein.

Timing Subsystem

The timing subsystem 110 generates timing windows for speech captions the content items 135, at least for those content items that did not have accompanying caption data when received by the content subsystem 140. As noted above, these timing windows include start and end timestamps indicating the start and end of speech sounds in an audio stream for a content item. To generate these timing windows, the timing subsystem 110 may include a speech classifier 115 and a score smoother 120. The speech classifier 115 generates raw scores representing the numerical likelihood that segments of the audio stream include speech sounds. The score smoother 120 generates binary scores for segments of the audio from smoothing the raw scores from the speech classifier 115. A binary score for a segment of the audio stream of a content item indicates an affirmative, best-estimation determination by the smoother 120 whether or not that segment has a speech sound or no speech sound, and may be used to generate timing windows for the audio stream indicating where speech sounds begin and end in the audio stream.

The speech classifier 115 generates raw scores indicating the probability that a segment of an audio stream (of a content item 135) includes a speech sound (language-agonistic). To generate these raw scores, the speech classifier 115 splits or divides the audio stream into multiple segments (e.g., of 250 milliseconds (ms) length each). Each segment may partially overlap with the preceding and following segments. The speech classifier 115 analyzes each segment using a trained model or classifier to determine the likelihood that the segment of the audio stream exhibits speech sounds. This likelihood may be represented using a numerical value, i.e., the raw score. The model may be trained using features extracted from a corpus of data comprised of existing captions for speech sounds in audio streams. While the model may be trained to indicate whether a sound is speech, it may not necessarily be trained to determine the actual phoneme, syllable, word, sentence, or other semantic or syntax of the speech sounds, as for the purpose of generating timing windows, may be sufficient to determine whether speech exists. Additional details regarding the speech classifier 115 are described below with reference to FIG. 2.

The score smoother 120 generates a binary score from the raw scores from the speech classifier 115 by smoothing the raw scores. As the raw scores generated by the speech classifier 115 may fluctuate with a high frequency over a short period of time (e.g., 1 second), using the raw scores directly may cause the undesirable result of having multiple timing windows for a single section of speech in the audio. From the perspective of someone trying to add captions to timing windows or read captions entered into these timing windows, the amount of captioned speech entered into each window may be too small to coherently map to activity on the screen, and a viewer may have difficulty reading and follow what is going on, as the timing windows would often be too short to stay on screen for any meaningful duration. Instead, the score smoother 120 generates binary scores that do not fluctuate significantly and are thus "smoothed."

The score smoother 120 smooths the raw scores for a certain segment of the audio stream by aggregating a series of raw scores over consecutive segments of the audio stream to generate an aggregate value. For example, the score smoother 120 may aggregate the raw scores from segments of the audio stream totaling 1000 ms of time. The aggregation may be a mathematical or statistical operation such as an average or median. If the aggregate value exceeds a threshold, then the binary score for that series of consecutive segments may be set to 1 (i.e., on or high, indicating the presence of speech). Otherwise the binary score for that series of consecutive sections may be set to 0 (i.e., off or low, indicating the absence of speech). Each series of consecutive segments for which the score smoother 120 determines the binary scores may partially overlap with other series of consecutive segments. After smoothing the raw scores into binary scores, the score smoother 120 generates the timing windows corresponding to these binary scores (e.g., each timing window associated with a contiguous period of 1 for the binary score), and may adjust the threshold value if the score smoother 120 determines that the timing windows introduce a high amount of error. Additional details regarding the score smoother 120 are described below with reference to FIGS. 3-5.

Caption Subsystem

The caption subsystem 150 provides the speech captions 140 to client devices 170 for presentation with associated content items 135, and also provides an interface for users to provide speech captions 140 for content items 135 that may not have speech captions 140 associated with them.

When a client device 170 requests, and is presented with a content item 135, if that client device 170 also requests captions for the content item 135, the caption subsystem 150 may provide the captions for the content item 135 to the client device 170 for presentation alongside the content item 135. The caption subsystem 150 may select the speech captions 140 associated with the content item 135 and transmit these captions to the client device 170 with instructions to present the text within certain entries in the speech captions at certain times during the playback of the content item 135 such that the text in each entry is presented according to the timing window information for that entry. For example, the instructions may cause the client device 170 to present the text for a caption entry during playback between the start timestamp and the end timestamp of the timing window associated with that caption entry. In addition, the instructions may also instruct the client device 170 on how to visually format the text for presentation (e.g., font style, font type, font size, text position on screen, etc.). In one embodiment, in addition to speech captions 140, the caption subsystem 150 also retrieves a set of non-speech captions describing non-speech sounds in the content item (e.g., laughter) and transmits these non-speech captions to the client device 170 along with instructions on how to present them.

The caption subsystem 150 receives user-generated entries for speech captions 140 from client devices 170 for content items 135 that do not have caption information or have incomplete or inaccurate caption information (e.g., automatic captioning using speech recognition may not produce accurate results). The users of the client devices 170 can transcribe the speech sounds (e.g., spoken dialogue) in the content items 135 into text and submit this transcribed text to the caption subsystem 150, which may store them as part of caption entries.

In other systems, when transcribing a particular series of speech sounds for a portion of speech, a user has to specify the start and end timestamps for that portion of speech to the caption subsystem 150. In other words, the user has to manually specify the timing windows for each portion of text that the user transcribes. Specification of the timing windows is tedious for the user, and may thus discourage the user from providing transcriptions of the speech sounds.

To address this, the caption subsystem 150 includes an assisted captioning module 160 that uses the timing windows generated by the timing subsystem 110 for a content item 135 in order to automatically provide the timing windows for portions of speech in the content item 135. By providing the automatically determined timing windows for the portions of speech in the content item 135, the assisted captioning module 160 is able to greatly reduce the effort of a user when that user provides user-transcribed text for speech captions 140 for the content item 135. This, along with other features (e.g., a ratings score for each user), increases the incentive for users to assist in (e.g., crowd source) transcribing text from speech in content items.

Additionally, the caption subsystem 150 may also include a caption timing modifier 155 to create the final timing windows for the caption boxes that are displayed to the user. The caption timing modifier 155 may modify the timing windows generated by the timing subsystem 140 based on a set of configurations. The caption timing modifier 155 modifies the timing windows to produce a set of caption boxes that are more visually pleasing for a viewer. For example, the caption timing modifier 155 may split timing windows that are beyond a certain duration so that more than one caption box may be generated from this timing window. As another example, the caption timing modifier 155 may concatenate together multiple timing windows that are shorter than a certain duration, or may extend timing windows that are shorter than a certain duration. Additional details regarding the caption timing modifier 155 and the assisted captioning module 160 are described below with reference to FIGS. 6-7.

III. Speech Captain Classifier

Figure 2:
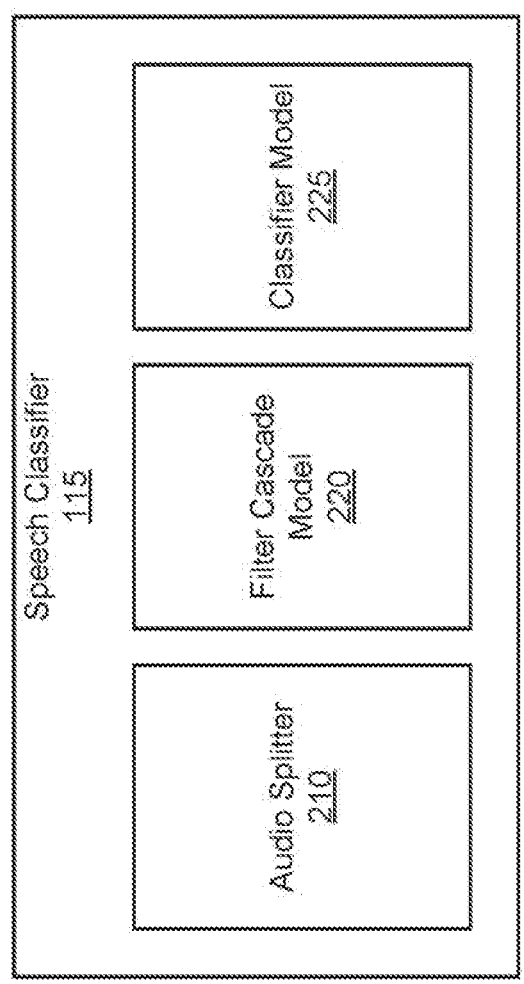
FIG. 2 is a high-level block diagram of the speech classifier, according to an embodiment.

FIG. 2 is a high-level block diagram of the speech caption classifier 115, according to an embodiment. The speech caption classifier of FIG. 2 includes an audio splitter 210, a filter cascade model 220 (for determining features), and a classifier model 225 (for determining a raw score as described above). While certain elements are shown in FIG. 2, in other embodiments the environment may have different elements. Furthermore, the functionalities between elements may be distributed in a different manner in other embodiments, to different or multiple modules.

The audio splitter 210 splits the audio stream of a content item 135 into different segments. The audio splitter 210 splits the audio stream into small segments of a particular duration, with each segment offset from the start of a previous segment by an interval. In some cases, the duration of each segment is longer than the offset interval of time between each segment, and thus the segments may partially overlap. For example, each segment may be separated by a 10 ms interval, and each segment may be 250 ms in duration. Thus, a 10 second audio clip would have 1,000 separate segments, with the first segment starting at 0ms and ending at 250 ms, the second segment starting at 10 ms and ending at 260 ms, and so on. The last segment would start at 9,750 ms (i.e., 10,000 ms-250 ms) and end at 10,000 ms. In particular, the number of segments within an audio clip of X duration would be: ((X-segment size)/interval size)+1.

Alternatively, the last segment may be shorter in duration and may not have a duration equal to the duration of the other segments. While the duration is indicated to be 250 ms in the example here, in other embodiments, the duration is 1000 ms (i.e., one second). In another embodiment, the last segment may be of the regular segment length, and where the segment exceeds the length of the audio clip, the segment is padded with a null or zero signal. For example, referring to the above example, for a segment that starts at 9900 ms in the 10 second clip, the remaining 150 ms of the segment beyond the end of the audio clip may be padded with zeros.

The filter cascade model 220 receives from the audio splitter 210 the segments of the audio stream of a content item and extracts features for each corresponding segment. In one embodiment, the filter cascade model 220 is based on the physiology of the human ear. The filter cascade model 220 may divide the input sound into multiple frequency channels, and include a cascade of multiple filters (with gain control coupled to each filter). Each filter filters out a particular range of frequencies or sounds, and the (numerical) output from these various filters are used as the basis for the features, which are used by a classifier model 225 to classify the speech sounds in the segment. In one embodiment, the output of the filters may be processed to generate auditory images which are used as the basis for the values of features for the classifier model 225.

In one embodiment, the filter cascade model 220 is a Cascade of Asymmetric Resonators with Fast-Acting Compression (CARFAC) model. The CARFAC model is based on a pole-zero filter cascade (PZFC) model of auditory filtering, in combination with a multi-time-scale coupled automatic-gain-control (AGC) network. This mimics features of auditory physiology, such as masking, compressive traveling-wave response, and the stability of zero-crossing times with signal level. The output of the CARFAC model (a "neural activity pattern") can be converted to capture pitch, melody, and other temporal and spectral features of the sound.

Although the features are extracted using a filter cascade model 220 as described here, in other embodiments the features may be extracted using another model, such as a spectrogram modified by a mel filter bank. In other words, the speech classifier 115 utilizes mel-frequency cepstral coefficients (MFCCs) as the extracted features of the audio stream. These MFCCs represent a power spectrum of the audio based on a perceptual scale of pitches, known as the mel scale. Other methods of extracting features, such as using the raw spectrograms of the audio segments themselves as features, may also be used.

After the values of the features are generated by the filter cascade model 220, the speech classifier 115 inputs the values of the features into a classifier model 225. The classifier model 225 may be a machine learning model, such as a deep neural network, a Bayesian network, a support vector machine, or other machine learning model, which accepts as input the values of the features for a segment of the audio and generates a raw score for that segment indicating the likelihood that the segment includes a speech sound. This raw score may be scaled from 0 (0% likelihood) to 1 (100% likelihood). For example, the classifier model 225 may indicate for a segment of the audio that the raw score (i.e., likelihood) of a speech sound occurring in the segment is 0.6 (60%).

To train the classifier model 225, features extracted from a training set of data (using the filter cascade model) are used. The training data includes audio streams and corresponding caption labels indicating the timing windows within the audio streams where speech sounds are known to occur. The caption labels for an audio stream may also indicate that speech occurs at a certain point in time or segment of an audio stream or that speech occurs within a time range. The caption labels may transcribe the actual speech in the audio stream, or may simply indicate where speech occurs. The training data may include speech from different languages, and may include speech in its various forms, such as whispered speech, sung speech, etc. In some cases, the different languages and forms of speech may be labeled differently. In one embodiment, the audio streams in the training data may be split into intervals, such as two second intervals, with each interval to be used separately as a training sample.

The training data may be retrieved from the content store 110 and may be based off captions for content items that have already been associated with captions that were provided by users with good trust scores above a certain threshold. These trust scores are described in further detail below. The training data may be updated and the model retrained periodically as new training data is received. The training data may also be retrieved or received from a third party (e.g., from corpus of broadcast caption data and audio). The classifier model 225 may train itself, or the training may be performed by an administrator or other user.

The training process may be iterative (e.g., via the use of back propagation), and for each iteration, may update the weights within the classifier model 225 to minimize the error between the output from the classifier model 225 and the ground truth data for all samples in the training set of data. For example, within the training set, the occurrence of speech may be given a numerical score of "1," and the non-occurrence of speech the numerical score of "0." The classifier model 225 is trained such that it most closely approximates these values (e.g., the "1" and "0") within the ground truth data, i.e., such that the delta between the output of the classifier model 225 and the ground truth values are minimized. As the training data may not be completely accurate, the value of certain parts of the training data may also be weighed differently depending upon the source of the data. For example, training data may be weighed depending upon the quality of the audio stream recording (e.g., microphone quality) of the source for the training data.

After the initial training process, extracted features from a set of test data that is separate from the training data and which is also associated with a set of caption labels may be fed into the classifier model 225 to verify that the output of the classifier model 225 is accurate. If the test data shows an error in the output beyond a certain threshold, the classifier model 225 may be retrained using a larger data set or with a different set of initial weights.

IV. Exemplary Speech Classifier Raw Score Plot

Figure 3:
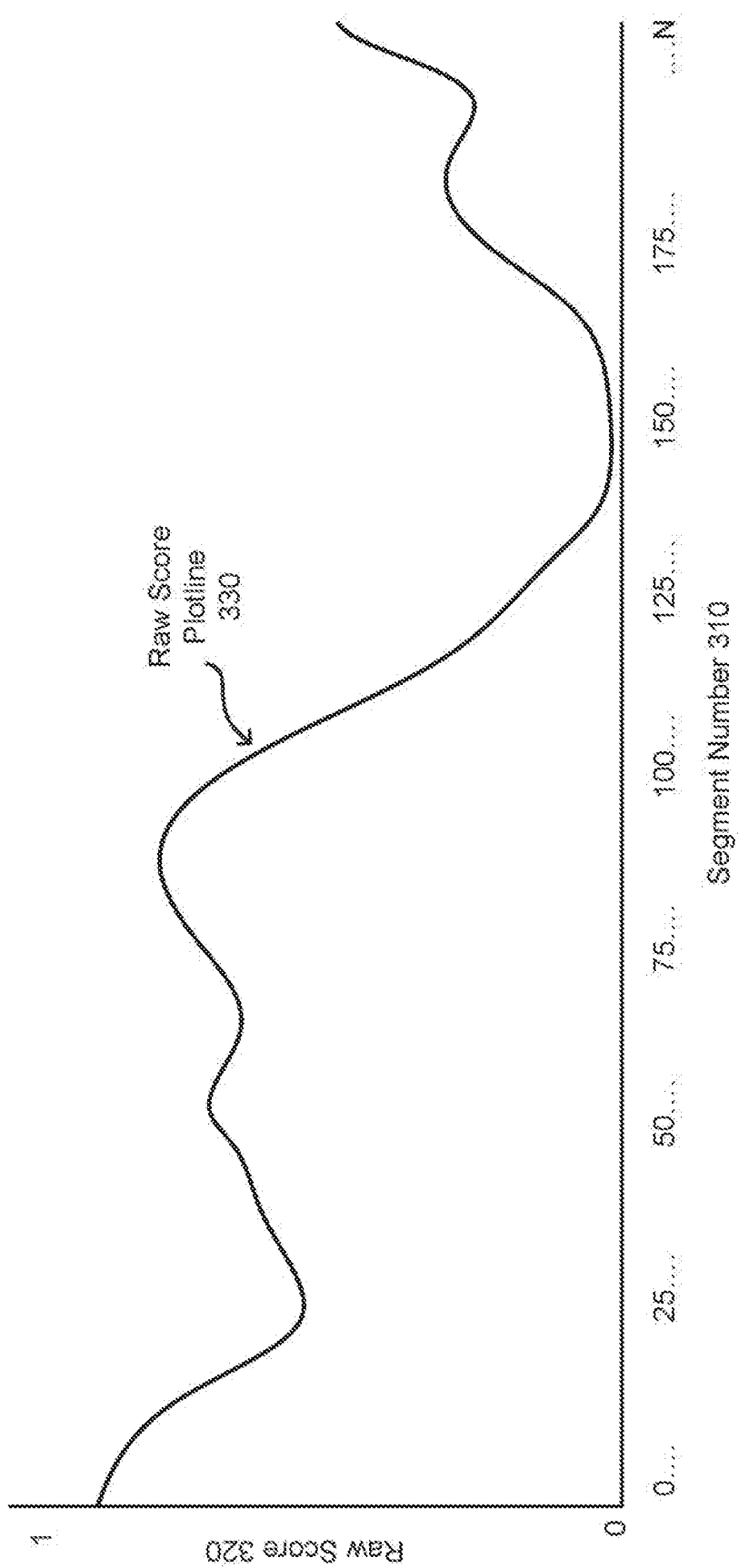
FIG. 3 illustrates an exemplary plot of the output of raw scores from the speech classifier, according to an embodiment.

FIG. 3 illustrates an exemplary plot 300 of the output of raw scores from the speech classifier 115, according to an embodiment. As shown in FIG. 3, the raw scores are generated by the speech classifier 115 over the duration of the audio stream for the content item for each segment. As illustrated in FIG. 3, there are N number of segments, which are labeled as segment numbers 310 on the horizontal axis of the plot 300. Each segment is of a certain duration, and starts at a specified offset interval from the start of the previous segment, as described above. As each segment may only be offset from the previous section by a short offset interval, a single audio stream may have many hundreds or thousands of segments or more.

The speech classifier 115 generates a raw score for each of these segments. This raw score is indicated as raw score plotline 330 on the plot 300. As shown in FIG. 3, the raw score that is generated by the speech classifier 115 may vary significantly over time and the raw score may be spread across the entire range of possible scores. Due to the fluctuation of the raw scores, they may not be readily usable as an indicator for whether speech has occurred at a point in time in the audio stream. Instead, as described below, the raw scores are smoothed into a set of binary scores. Note that although the curve shown in FIG. 3 may seem continuous for ease of illustration, the actual raw scores that are generated are discrete.

V. Exemplary Process for Score Smoothing

Figure 4:
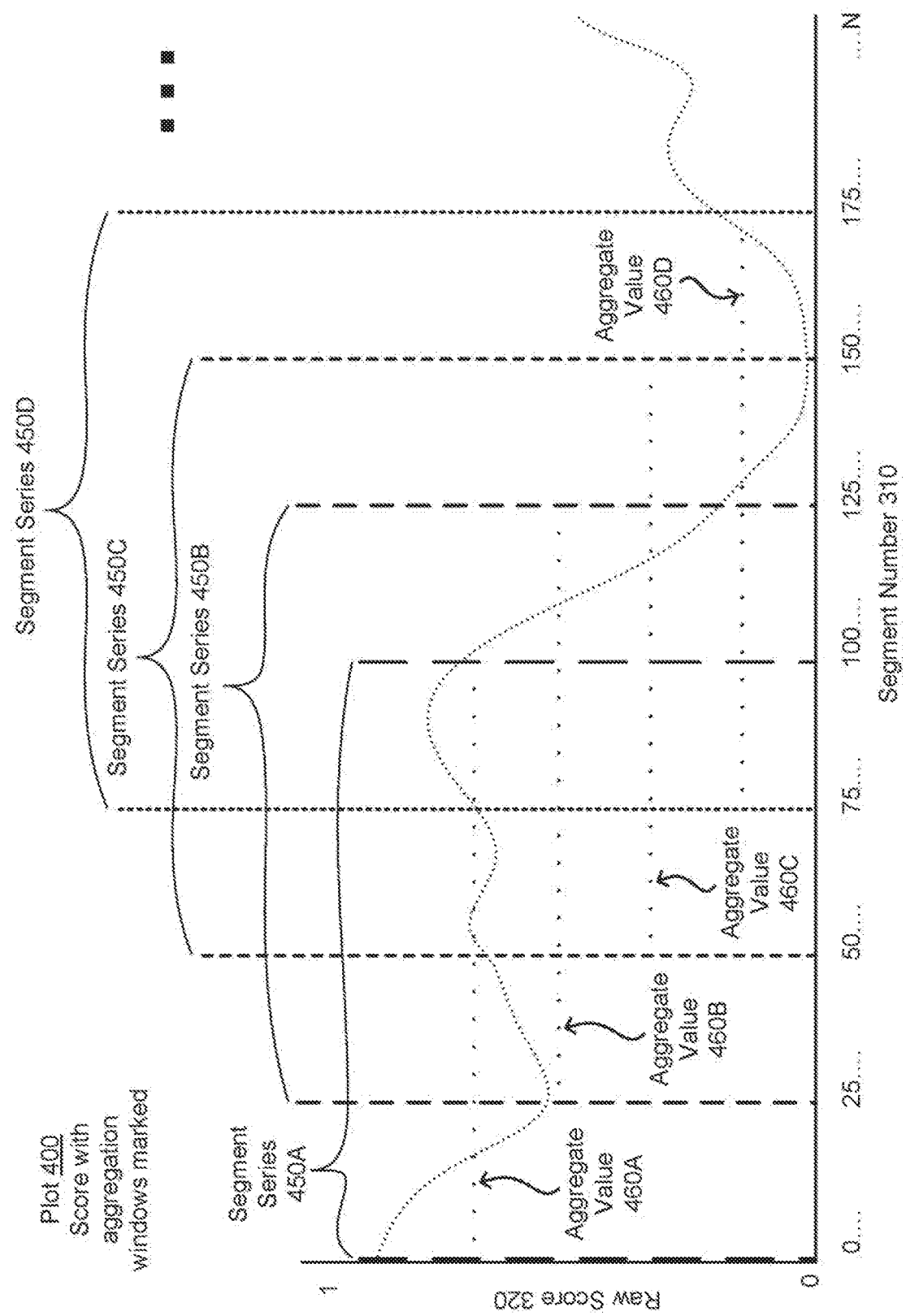
FIG. 4 is an exemplary plot illustrating the process by which the score smoother aggregates the raw scores to generate binary scores, according to an embodiment.

FIG. 4 is an exemplary plot 400 illustrating the process by which the score smoother 120 aggregates the raw scores to generate binary scores, according to an embodiment. As noted previously, the score smoother 120 "smooths" the raw scores generated by the speech classifier 115, and generates a set of binary scores based on the raw scores. To generate these binary scores, the score smoother 120 generates or computes an aggregate value for each of a series of consecutive segments in the audio stream based on the raw scores of the segments in each series (as computed by the speech classifier 115). Each series of consecutive segments upon which the score smoother 120 acts may include a certain number of segments (e.g., 100 overlapping segments equaling one second of time), and each series may be offset from the previous series by a certain number of segments (e.g., one segment) or a certain time interval (e.g., 250 ms).

The aggregate value is computed using an aggregation function by the score smoother 120. The aggregation function may be any statistical or mathematical operation that generates a single value from multiple values of a similar type, where the single value is representative of some property, characteristic, or other feature that is dependent upon the multiple values. Examples of such aggregation functions may include a median, an average, a variance, a standard deviation, a geometric mean, and so on. In one embodiment, the score smoother 120 uses a predetermined aggregation function against the raw scores in the series of segments to generate the aggregate value.

In another embodiment, the score smoother 120 selects between multiple aggregation functions to determine the most optimal aggregation function to use. To determine the most optimal aggregation function to use, the score smoother 120 may use a validation set of data in which the caption labels are known, and selects the aggregation function that produces the set of aggregate values that best match the ground truth of the validation data. For example, the score smoother 120 may first use an average as the aggregation function on the raw scores generated from the validation data (by the speech classifier 115), and compare the resulting aggregate values with the caption labels of the validation set of data to determine the amount of error (delta) of the aggregate values from the values of the ground truth. The score smoother 120 may then determine the error using the other aggregation functions, and select the aggregation function that produces the least error over all aggregate values.

As shown in FIG. 4, each of the exemplary series 450A-D of consecutive segments includes 100 segments each. As each segment is offset from the previous segment by 10 ms, each segment series 450 includes about one second worth of segments. For each segment series 450, the score smoother 120 computes an aggregate value 460A-D based on the raw scores of the segments in the respective segment series 450. Thus, the aggregate value 460A is computed using the raw scores of the segments in the segment series 450A, the aggregate value 460B is computed based on the raw scores in the segment series 450B, and so on. For the purposes of illustration, the aggregate values 460 shown in the plot 400 represent an average of the raw scores of the segments in the respective segment series 450, however, another aggregation function could be used to generate the aggregate values 460 in another embodiment. Note that the average in the illustration may not be mathematically accurate and may only be an approximation of an average for the purposes of the illustration.

Based on the aggregate values, the score smoother 120 generates the binary score as described in further detail below with regards to FIG. 5.

VI. Exemplary Output of Binary Scores from Smoothing

Figure 5:
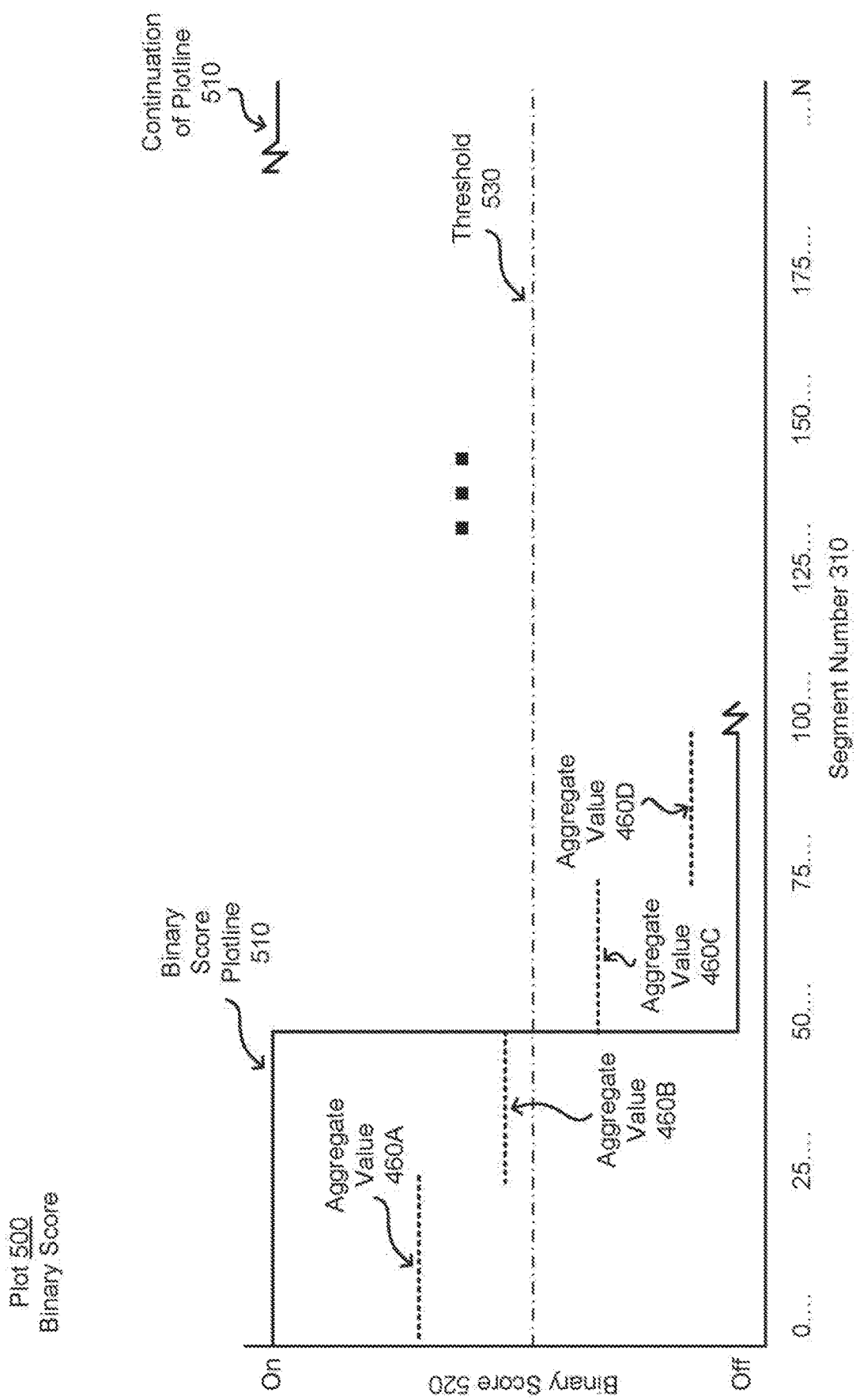
FIG. 5 illustrates an exemplary plot having an exemplary output of binary scores from the score smoother and based on the aggregate values, according to an embodiment.

FIG. 5 illustrates an exemplary plot 500 having an exemplary output of binary scores from the score smoother 120 and based on the aggregate values 460 as shown in FIG. 4, according to an embodiment. These binary scores are used to generate the timing windows for captions for speech sounds in the audio stream. To generate the binary scores, the score smoother 120 takes each aggregate value 460 associated with each segment series and determines whether that aggregate value 460 is above or below a threshold value. If an aggregate value 460 is above the threshold, then the score smoother 120 sets the binary score to "on" for the section of the audio stream corresponding to the segment series 450 that was used to generate the aggregate value 460, and which does not overlap with any other segment series (an example is presented below). Similarly, if the aggregate value 460 is below the threshold, the score smoother 120 sets the binary score to "off" for the corresponding section.

In one embodiment, the threshold value is a default pre-configured value. In another embodiment, the threshold value that is selected by the score smoother 120 varies based upon the aggregation function used to generate the aggregate values. In another embodiment, the threshold value is determined dynamically by the score smoother 120 based on a validation set of data (a ground truth). The score smoother 120 selects a threshold value and generates a set of binary scores.

The score smoother 120 generates timing windows corresponding to the binary scores. For example, the score smoother 120 determines that a start timestamp corresponds to a time in the audio stream when the binary score switches from off to on, and the corresponding stop timestamp is when the binary score switches from on to off. After generating the timing windows, the score smoother 120 compares the timing windows to the validation data to determine the error value. The error value is equal to half of the total sum of all the deltas (differences) between the actual start and end timestamps in the ground truth validation set and the corresponding start and end timestamps computed by the score smoother 120 using the binary scores. The score smoother 120 may adjust the threshold value iteratively in order to reach a lower error value.

The process described above is further illustrated in plot 500. As illustrated, the horizontal axis remains as the segment numbers 310, however, the vertical axis represents the binary score 520 instead of a range of raw scores as illustrated in FIGS. 3 and 4. As shown in FIG. 5, the binary score plotline 510 represents the plot of the generated binary scores, and moves between the off and on (e.g., 0 and 1). The aggregate values 460 from FIG. 4 are overlaid as dotted lines. When an aggregate value 460 is above the threshold value 430 (represented by a dashed line), the binary score is set to "on" for the corresponding section, and when the aggregate value 460 is below the threshold value 430, the binary score is set to "off" for the corresponding section. Each corresponding section aggregate value is a section of the audio stream from the start timestamp of the first segment used to calculate the aggregate value until the point in time where a second segment series is introduced. For example, in the illustrated plot 500, the section corresponding to the aggregate value 460 starts at segment number zero and ends at segment number 25 (the point where the next segment series and next aggregate value starts).

In the illustrated plot 500, the binary score plotline 510 stays at an "on" position until segment number 50, and then switches to an "off" position. The entire audio stream may include many more segments. The binary score plotline 510 continues for the entire length of the audio stream until it reaches the end (segment N). Note that the jagged lines in the binary score plotline 510 indicate that parts of the binary score plotline 510 are not shown here.

After generating the binary scores, the score smoother 120 also generates the timing windows corresponding to these binary scores. The timing windows correspond to time positions in the audio stream when the binary score switches between on and off. Specifically, a start timestamp for a timing window corresponds to when the binary score switches from "off" to "on" (or "0" to "1") and a stop timestamp of a timing window corresponds to when the binary score switches from "on" back to "off". The time period between the start and stop timestamps is the portion of the audio stream for which the content system 105 determines that a speech sound occurs. The raw scores, binary scores, and/or the timing windows may be stored by the timing subsystem 110 in the content store 130, and specifically, may be stored as speech captions 140 for the associated audio stream and content item 135.

By having the score smoother 120 perform this smoothing operation, the raw scores are converted into a set of binary scores which fluctuate less often and are more stable, with longer periods between on/off transitions. The resulting timing windows the score smoother 120 generates from these binary scores are more likely to increase usage of the captions compared to a system that uses the raw scores to generate the timing windows directly. Note that the plots here may not be drawn to scale, and may not be computationally/mathematically accurate, but are rather shown for illustrative purposes.

Exemplary Caption Timing Modifier and Assis Fed Captioning Module

Caption Timing Modifier

Figure 6B:
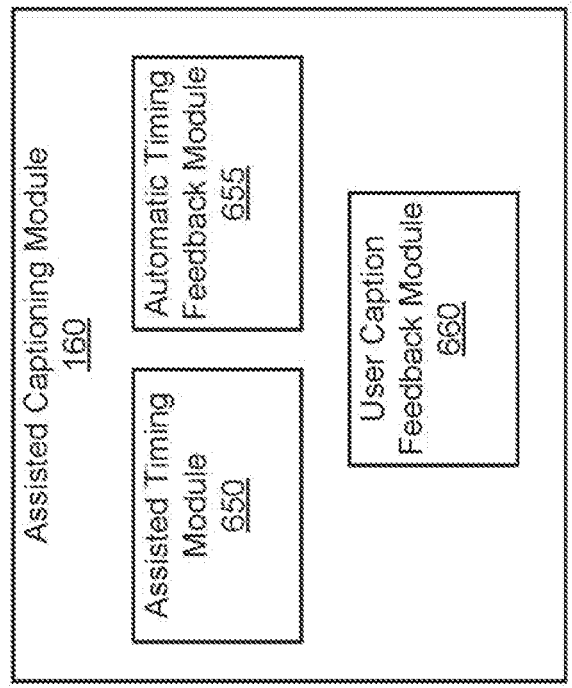
FIG. 6B is a high-level block diagram of the assisted captioning module, according to an embodiment.
Figure 6A:
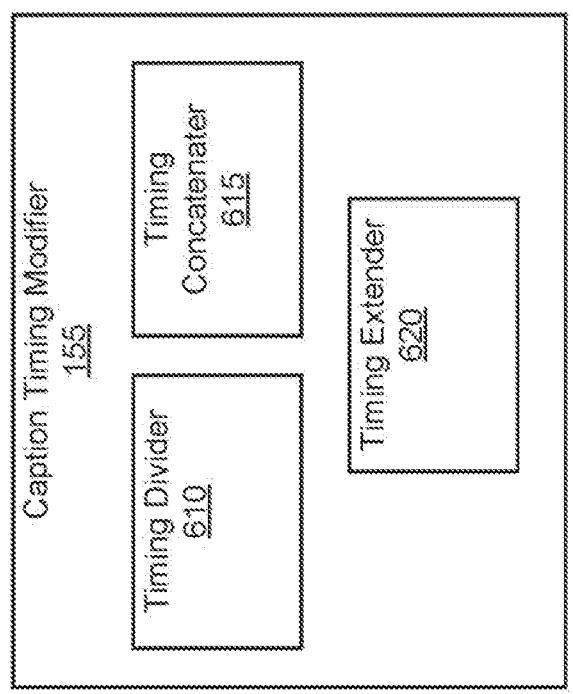
FIG. 6A is a high-level block diagram of the caption timing window modifier, according to an embodiment.

FIG. 6A is a high-level block diagram of the caption timing modifier 155, according to an embodiment. The caption timing modifier 155 of FIG. 6A includes a timing divider 610, a timing concatenater 615, and a timing extender 620. While certain elements are shown in FIG. 6A, in other embodiments the environment may have different elements. Furthermore, the functionalities between elements may be distributed in a different manner in other embodiments, to different or multiple modules.

The timing divider 610 divides those timing windows of longer duration so that more than one caption box is generated for such timing windows. As used here, the duration of a timing window is the difference in time between the start timestamp and the end or stop timestamp of the timing window. As noted, the start timestamp indicates the beginning of the speech sound in the audio stream, and the end or stop timestamp indicates the ending of the speech sound in the audio stream. When a timing window is of a duration longer than a predefined maximum duration (e.g., 10 seconds), the timing divider 610 may divide or split the timing window into multiple timing windows such that the caption boxes created from these multiple timing windows are shorter in length and are more likely to drive increased usage of the captions by users of the content system 105. For example, if a timing window has a 10 second duration (where speech sounds are present throughout in the corresponding audio stream), without splitting the timing window into multiple timing windows, a caption box generated from this caption would have a 10 second duration, and may be very large when displayed on screen. This may be likely to cause users to disable captions and reduce the adoption rates for captions. Instead, the timing divider 610 divides such timing windows into smaller timing windows that may generate caption boxes that are displayed for shorter periods of time.

The timing divider 610 may divide the timing window into smaller timing windows of a certain preset duration (e.g., 3 seconds). In some cases, by splitting the timing window into these smaller timing windows, the resulting timing windows may include a remaining timing window (at the "end" of the original timing window) that is of a undesirably short duration below a minimum threshold (e.g., 1 second). In such a case, the timing divider 610 may instead combine the timing window that proceeds this remaining timing window and this remaining timing window together, and divide this combined timing window in half in order to generate two timing windows of equal duration, and to generate an end timing window that is not undesirably short. The timing divider 610 may also simply divide the timing window into a certain number of divisions (e.g., by two divisions) such that the resulting timing windows are shorter than the predefined maximum duration, instead of dividing the timing windows into multiple timing windows of preset duration.

In one embodiment, the timing divider 610 receives from the timing subsystem 110 an indication of positions in a timing window where a short gap (e.g., a micro gap) occurs. These may be gaps of a very short duration (e.g., 0.2 secs) for which the smoothing process disregards, but for which may be used as a dividing point. Although the speech sounds are essentially continuous for the entire duration of the timing window, splitting the timing window at the gap allows for the generation of caption boxes that are split naturally at the gap point and thus create a more visually pleasing result.

The timing concatenater 615 combines timing windows that are below a predefined minimum duration in order to generate caption boxes that are presented for at least the predefined minimum period of time. When multiple timing windows in the audio stream have durations below the predefined minimum (e.g., 1 second) and are also within a certain interval from each other (e.g. 0.5 seconds), the timing concatenater 615 may combine or concatenate the timing windows together into a single timing window, such that a caption box based on the combined timing window is displayed for the duration of the combined timing window period, rather than individually for the duration each of the original, shorter timing windows. This allows for a display of the caption boxes that does not "flicker" where the caption boxes are displayed and then removed from view in quick succession. The timing concatenater 615 may concatenate these shorter duration timing windows together up to the predefined maximum duration as described earlier. If additional timing windows are to be concatenated, the timing concatenater 615 concatenates these additional timing windows into a separate combined timing window.

The timing extender 620 extends a timing window that has a duration that is less than the predefined minimum so that the duration of the timing window is at least the duration of the predefined minimum. When a timing window is less than the predefined minimum duration, but is not temporally adjacent to another timing window by a certain interval (e.g., 1 second), and is thus isolated from other timing windows, the timing extender 620 extends the duration of the timing window by shifting either the start or end timestamp of the timing window, such that the caption box generated by that timing window is presented for at least the predefined minimum duration. This creates a caption box that appears for the predefined minimum duration, allowing a user to have enough time to read the caption, rather than having the caption flash quickly during presentation.

Whether the timing extender 620 shifts the start timestamp back, the end timestamp forward, or both depends upon the context in which the timing window is presented in. If the start timestamp of the timing window is near or at the start of the audio stream (e.g., within 0.2 seconds), the timing extender 620 may shift the end timestamp of the timing window forward until the duration of the timing window meets the predefined minimum. If the end timestamp of the timing window is near or at the end of the audio stream (e.g., within 0.5 seconds), the timing extender 620 shifts the start timestamp of the timing window back until the duration of the timing window meets the predefined minimum. In one embodiment, the timing extender 620 may modify the audio stream instead to add a section of silence in order to accommodate the timing window with the shifted timestamps. For example, the timing extender 620 may extend the end timestamp of a timing window beyond the end of the audio stream, and then insert a section of silence into the end of the audio stream matching the duration of the timing window that exceeds the end of the original audio stream.

If the timing window is not near the end or start of the audio stream, the timing extender 620 may extend the end timestamp of the timing window until the predefined minimum is met. However, if extending the end timestamp causes the timing window to be within a certain gap interval (e.g., 1 seconds) of another timing window of long duration, the timing extender 620 may instead shift both the start and end timestamps of the timing window so that the predefined minimum duration is met, and so that the timing window is at least the certain gap interval from the longer duration timing window.

Assisted Captioning Module

FIG. 6B is a high-level block diagram of the assisted captioning module 160, according to an embodiment. The assisted captioning module 160 of FIG. 6B includes an assisted timing module 650, an automatic timing feedback module 655, and a user caption feedback module 660. While certain elements are shown in FIG. 6B, in other embodiments the environment may have different elements. Furthermore, the functionalities between elements may be distributed in a different manner in other embodiments, to different or multiple modules.

Figure 7:
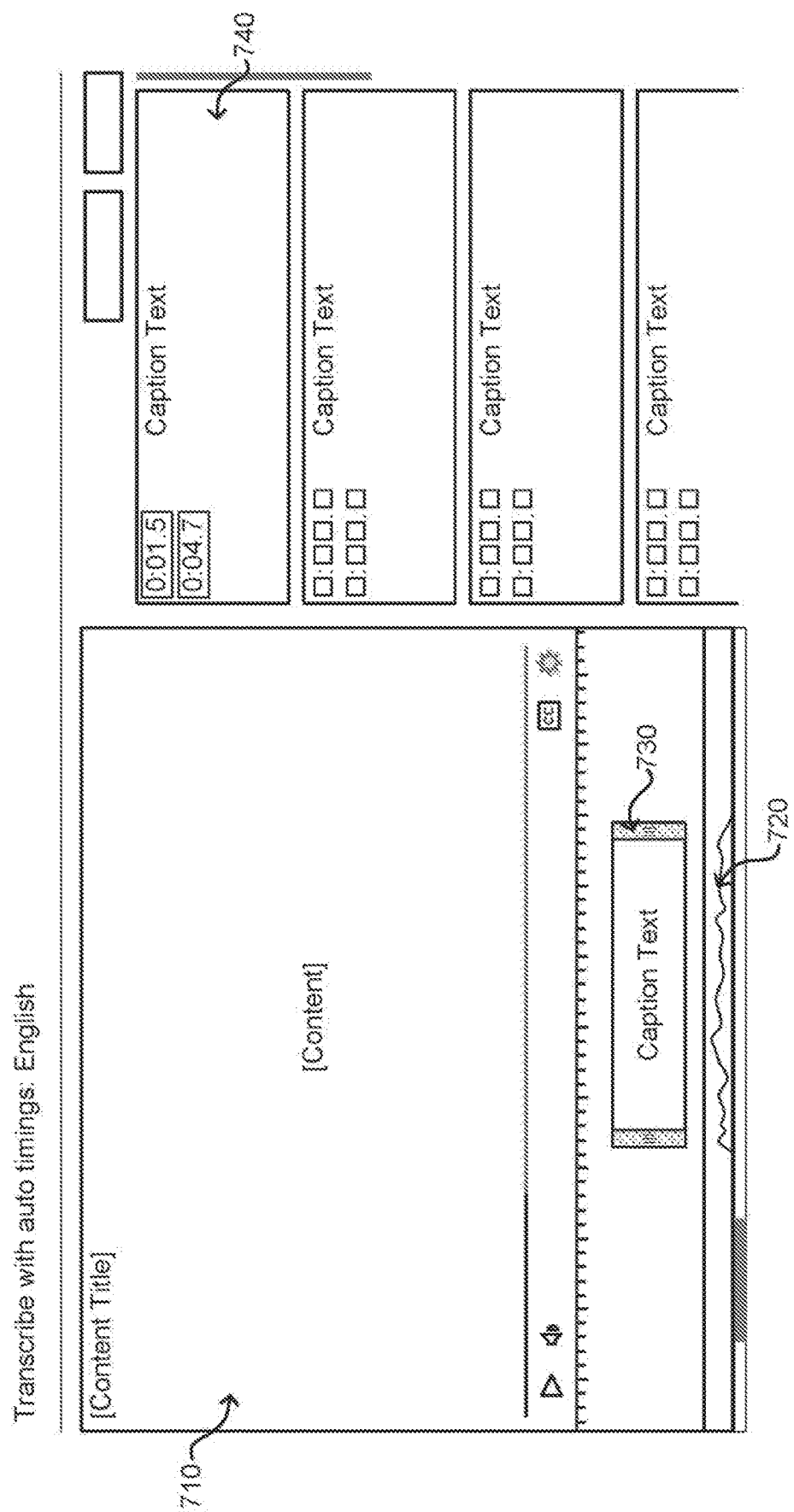
FIG. 7 illustrates an exemplary user interface (UI) with caption boxes having automatically generated captions, according to an embodiment.

The assisted timing module 650 provides a graphical interface having caption boxes according to automatically generated caption timing windows to a client device 170 for the user to provide caption text. The automatically generated caption timing windows may be received directly from the timing subsystem 110 or via the caption timing modifier 155. When the caption subsystem 150 receives a request from a client device 170 indicating that a user wishes to submit captions for an audio stream associated with a content item, the assisted timing module 650 provides an interface to the user (e.g., by sending HTML or other code to the client device 170 presenting the interface) that allows the user to play back the audio stream (along with any accompanying video) and enter in caption text for the speech sounds in the audio stream. The assisted timing module 650 also accesses the timing windows for the audio stream (which may have been generated dynamically or previously when the content item was uploaded), and provides the user with an interface with caption boxes along with the start and end timestamps of each caption box according to these timing windows, as well as an option to modify the start and end timestamps. This allows the user to see the duration of each caption, enter the caption text associated with each caption, and modify the start and end timestamps of each caption, if the automatically generated timing windows for the caption are determined by the user to be inaccurate or undesirable in some way. An exemplary user interface presented by the assisted timing module 650 is shown in FIG. 7 and described below.

In one embodiment, the assisted timing module 650 provides an interface to the user to allow the user to enter the captions for a content item 135 in long form. Thus, instead of entering the caption text for each individual speech sound separately, the assisted timing module 650 may allow the user to enter the entire caption text for the content item in a single block (e.g., in a single text box). The assisted timing module 650 splits the entered caption text into respective caption boxes based on the timing windows.

To do this, the assisted timing module 650 may determine the approximate speed or rate (e.g., syllables per minute) of the speech in the audio stream of the content item 135, based on the duration of all the automatically generated timing windows and the number of syllables in the entered caption text. Using the rate information, the assisted timing module 650 also determines where gaps or breaks in the entered text, which may be indicated by punctuation or other syntax (e.g., periods, new paragraphs, commas, etc.), may correspond to the gaps between the automatically generated timing windows. For example, a sentence in the entered caption text may correspond to the end of a timing window in the automatically generated caption data when the sentence is determined to be of the same duration as the timing window according to the rate of speech.

After splitting the entered text into the respective caption boxes, the assisted timing module 650 may prompt the user to verify whether the entered text was properly divided into the correct caption boxes. The user may modify the text in each caption box if needed.

In one embodiment, the assisted timing module 650 may utilize a speech recognition engine to automatically transcribe the speech in the content item into caption text, enter the caption text into the captions according to the automatically generated timing windows, and present this completed set of captions to the user for editing and verification. As the speech recognition of the speech in the content item 135 may not be completely accurate, the verification process allows the user to made edits to the transcribed text to improve the accuracy. The assisted timing module 650 may also feed this edited caption text back to the speech recognition engine to improve its accuracy. By first transcribing the text, in addition to automatically generating the captions, the assisted timing module 650 may save the user even more time when the user transcribes the speech of a content item 135 to caption text.

The automatic timing feedback module 655 determines the quality of automatically generated timing windows based on feedback received from users. In the content system 105, each grouping of content items, e.g., created by a single entity, or under a single username, etc., may be associated with a globally unique identifier. In some cases, this grouping of content items is identified at the level of channels, where each channel contains a group of content items assigned to the group by the user associated with the username. The automatic timing feedback module 655 may collect feedback from users for the quality of the automatically generated timing windows as they pertain to the creation of the caption boxes by the assisting timing window module 650 for each channel. This feedback is used to generate a score for the automatically generated timing windows for that particular channel. Certain passive feedback are considered negative, and negatively affects the score for the automatically generated timing windows for a channel. Examples of these include modifying the start and end timestamps of automatically generated timing windows for caption boxes, deleting an automatically added caption box, adding a new caption box for a speech sound where one was not automatically detected, and so on. These modifications indicate that the automatically generated timing windows were not accurate. A lower number of these negative feedback events may instead cause the automatic timing feedback module 655 to increase the score for the automatically generated timing windows for a channel. In some cases, feedback events from users with lower trust scores may be weighted to be less significant in computing the feedback score.

If the feedback score for a channel drops below a certain threshold (e.g., the threshold may be an average of current feedback scores in the content system 105 for all channels), then the automatic timing feedback module 655 may send a message to an administrator, or may use the newly generated captions from users as new ground truth data for the channel in further optimizing the classifier model used by the timing subsystem 110 to generate the binary scores as described above. This optimization and changes in parameters for the models may be specific to the channel for which the sub-par feedback score is indicated, or may be generally applicable, or may be weighted more strongly to the particular channel and not a strongly for other channels.

The user caption feedback module 660 determines trust scores for user contributions of caption text. The user caption feedback module 660, upon receiving a user contribution of caption text, performs one or more basic checks (e.g., "sanity" checks) upon the caption text to verify its accuracy and quality. The checks may concern the language, length, and other characteristics of the received caption text.

For example, the user caption feedback module 660 may check the caption text for improper vocabulary, and in particular, for profanity or other strong language. Depending upon the indicated rating of the content item, some language may not be expected to occur for an audio stream, and so the appearance of such language may cause the user caption feedback module 660 to lower the trust score for the contributing user. As another example, the user caption feedback module 660 may check to see if the length or coverage of the provided caption text roughly matches the length of the content item. If not, the user caption feedback module 660 may lower the trust score of the contributing user. As a final example, the user caption feedback module 660 may check to see if the language of the received caption text matches the language indicated for the content item (e.g., "English"). If the languages do not match, the user caption feedback module 660 may lower the trust score for the contributing user.

If a user's trust score is low, the user caption feedback module 660 may perform more checks on the contributions provided by the user. Additionally, the user caption feedback module 660 may request additional review by other users, as well as a final review by the entity (e.g., a user) that is marked as the owner of the content item. If a user's trust score is high (e.g., above a threshold), the user caption feedback module 660 may perform less checks on the user's contributions, and may require less reviews by other users. When requesting review from other users, the user caption feedback module 660 may indicate to the assisted timing module 650 to request an additional user to verify the accuracy of the provided caption text. The number of changes made by other users to the provided caption text may be proportional to a decrease in the trust score of the user who originally provided the caption text. In other words, the fewer the changes made by other users during verification, the higher the user's trust score may be. If a user's trust score is below a certain level, the user caption feedback module 660 may prevent that user from providing caption text.

VII. Exemplary Assisted Captioning User Interface

FIG. 7 illustrates an exemplary user interface (UI) with caption boxes having automatically generated captions, according to an embodiment. Although a set of UI elements are illustrated here, in other embodiments the UI elements may differ cosmetically in small variations or may differ significantly. However, the functionality of the UI in these other embodiments may be similar to the functionality described here.

The frame 710 displays a content item 135 for playback, and in particular, presents the portion of the content item 135 indicated by the seek bar near the bottom of the frame 710. If the content item 135 includes video, video is displayed in frame 710. Otherwise, only audio may be presented.

The frame 720 displays a detected waveform of the sound signal of the audio stream over time. As shown in FIG. 7, the frame 720 indicates a detected waveform for a duration of time near the position of the indicating arrow.

The caption box input element 730 is a user interface element that indicates that a caption box is to be displayed for a duration of the audio stream corresponding to the width of the caption box 730, and with a start timestamp of the caption box corresponding to the left boundary of the caption box input element 730, and with an end timestamp of the caption box corresponding to the right boundary of the caption box input element 730. The caption subsystem 150 (e.g., the assisted captioning module 160) may generate the caption box input element 730 using the automatically generated timing windows for captions as described above. For example, if the caption subsystem 150 determines that a speech sound occurs at 00:45 to 00:52, the caption subsystem 150 may generate a caption box input element 730 that has a left boundary at 00:45 and a right boundary at 00:52. Note that as the content is searched using the seek bar, and thus the timestamps that are displayed are shifted, the caption box input element 730 is also shifted in the user interface so that its boundaries consistently match the correct start and end timestamps.

Frame 740 displays the caption text and timing windows for each caption text in a list interface, instead of the timeline interface for the caption box input element 730. A user may interact with each caption box to edit its content or timing windows in frame 740 without seeking to the corresponding point in the content item 135. This may be useful during a final review process. As noted previously, the caption text may be automatically transcribed in an initial phase using a speech recognition engine. Furthermore, as noted above, the user may be allowed to first enter the caption text as a block of text, after which the caption subsystem 150 automatically determines where to split the entered caption text to match the caption boxes with the automatically generated timing windows. If the user is allowed to enter text as a large block, only a single caption text block is shown initially, and the multiple caption text blocks are shown afterwards upon processing as described above.

VIII. Exemplary Flow for Automatic Generation of Caption Timing Windows

Figure 8:
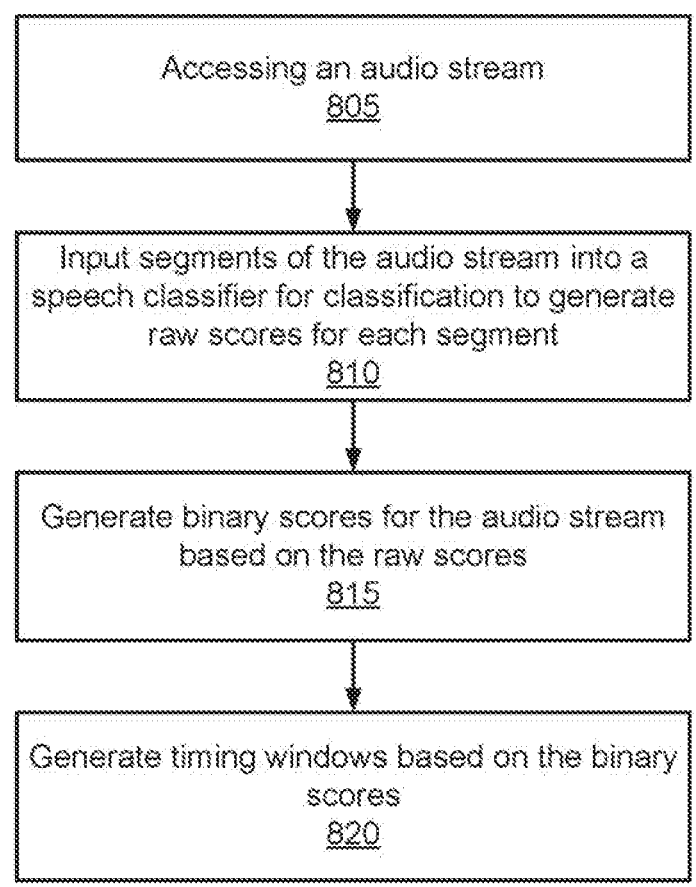
FIG. 8 is a data flow diagram illustrating the actions of the content system for the automatic generation of non-speech captions from an audio input, according to an embodiment.

FIG. 8 is a data flow diagram illustrating the actions of the content system 105 for the automatic generation of non-speech captions from an audio input, according to an embodiment. In one embodiment, the operations in the flow diagram are attributed to the content system 105. Initially, the content system 105 accesses 805 the audio stream. This may be a standalone audio stream (e.g., a podcast), or an audio stream that is the audio segment of a video.

The content system 105 inputs 810 segments of the audio stream into the speech classifier to generate the raw scores. The speech classifier generates, for each segment, a raw score indicating the likelihood that the segment includes an occurrence of a speech sound.

To do this, the content system 105 divides the audio stream into segments, each segment being of a particular duration and offset from the start of the previous segment by a particular interval. For example, the content system 105 divides the audio stream into 250 ms segments, with each segment being shifted 10 ms from the prior segment.

The content system 105 inputs each segment into a filter cascade model to generate features from the segments. The content system 105 inputs the features into a classifier model to determine the probability that a speech sound occurs in the segment. The classifier model may be a deep neural network.

The content system 105 generates 815 a set of binary scores for the audio stream based on the raw scores. The binary scores may be generated based on an aggregation of the raw scores from consecutive series of segments of the audio stream. For example, one binary score for a point in time in the audio stream may be generated based on an average of the raw scores of consecutive segments covering one second of time from the point in time. When the aggregated value exceeds a threshold, the content system 105 determines that the binary score for the corresponding point in time is "on". The threshold may be adjusted based on an error value calculated using a validation dataset.

The content system 105 generates 820 timing windows based on the binary scores. Each timing window indicates a beginning and ending timestamp corresponding to the beginning and end of a speech sound in the audio stream. These timing windows may be used to generate caption boxes of durations corresponding to the durations of the timing windows, in order to allow a user to more easily provide (e.g., "crowd-source") captions of content items in the content system 105.

Other Considerations

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

It should be noted that the process steps and instructions are embodied in software, firmware or hardware, and when embodied in software, can be downloaded to reside on and be operated from different platforms used by a variety of operating systems.

The operations herein may also be performed by an apparatus. Furthermore, the computers referred to in the specification may include a single processor or may be architectures employing multiple processor designs for increased computing capability. It will be appreciated that a variety of programming languages may be used to implement the teachings of the present invention as described herein, and any references below to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which are set forth in the following claims.

What is claimed is:

1. A method comprising:
   accessing audio data comprising a plurality of segments;
   determining, by a processing device, that one or more of the plurality of segments comprise speech sounds;
   identifying a time duration for the speech sounds; and
   providing a user interface element corresponding to the time duration for the speech sounds, wherein the user interface element indicates an estimate of a beginning and ending of the speech sounds and is configured to receive caption text associated with the speech sounds of the audio data.

2. The method of claim 1, further comprising:
   inputting the plurality of segments of the audio data into a speech classifier for classification, wherein the speech classifier generates a set of raw scores representing likelihoods that respective segments include occurrences of a speech sound;
   generating binary scores for the audio data based on the set of raw scores, wherein one of the binary scores is generated based on an aggregation of raw scores from consecutive series of the segments of the audio data; and
   generating a timing window for one or more of the speech sounds in the audio data based on the binary scores, wherein the timing window indicates the estimate of a beginning time and an ending time of the one or more speech sounds in the audio data.

3. The method of claim 2, wherein inputting the plurality of segments of the audio data into a speech classifier for classification further comprises:
   dividing the audio data into the plurality of segments, each segment being of a particular duration and offset from a start of the audio data;
   using a filter model to filter an audio signal of each of the plurality of segments to generate an output with multiple frequency channels;
   identifying features based on the output of the filter model; and
   inputting the features into a machine learning model, the machine learning model used to determine a raw score indicating a likelihood of an occurrence of a speech sound in the respective segment of the audio data.

4. The method of claim 2, wherein generating the binary scores for the audio data comprises:
   applying an aggregation function to raw scores of the consecutive series of the segments of the audio data;
   generating a plurality of aggregate values based on output of the aggregation function, each of the plurality of aggregate values being associated with one of the consecutive series of segments; and
   generating the binary scores based on the aggregate values, each binary score generated based on whether a corresponding aggregate value exceeds a threshold value.

5. The method of claim 4, wherein one or more of the plurality of segments are part of a validation data set, and further comprising:
   computing an overall error amount between the generated timing window and ground truth timing windows of the validation data set; and
   iteratively modifying the threshold value to minimize the error amount.

6. The method of claim 1, wherein the user interface element comprises one of a plurality of caption boxes, and further comprising:
   generating the plurality of caption boxes for the audio data, each caption box having a start timestamp and an end timestamp corresponding with a start and end timestamps of a generated timing window; and
   storing the plurality of caption boxes, wherein the caption boxes are configured to enable users to enter caption text in the caption boxes.

7. The method of claim 6, further comprising concatenating a set of timing windows that are temporally adjacent to each other into a single timing window, wherein each timing window in the set comprises a duration that is shorter than a predefined minimum.

8. The method of claim 6, further comprising dividing a timing window into a plurality of timing windows, wherein the timing window comprises a duration that is longer than a predefined maximum.

9. The method of claim 6, wherein the audio data comprises an audio stream and further comprising:
  receiving a request from a client device to enter captions for the audio stream;
  transmitting the plurality of caption boxes for presentation at the client device;
  receiving a plurality of caption text entries, each caption text entry associated with one of the plurality of caption boxes; and
  storing the plurality of caption text entries in association with respective caption boxes.

10. The method of claim 9, further comprising:
  receiving a request from a client device to present captions associated with the audio stream; and
  transmitting the plurality of caption boxes with associated caption text for the audio stream to the client device for presentation on the client device.

11. The method of claim 2, wherein the beginning time corresponds to a transition from a low to high value for the binary score, and the ending time corresponds to a subsequent transition from a high value to a low value for the binary score.

12. A computer program product comprising a non-transitory computer readable storage medium having instructions encoded thereon that, when executed by a processor, cause the processor to:
  access audio data comprising a plurality of segments;
  determine that one or more of the plurality of segments comprise speech sounds;
  identify a time duration for the speech sounds; and
  provide a user interface element corresponding to the time duration for the speech sounds, wherein the user interface element indicates an estimate of a beginning and ending of the speech sounds and is configured to receive caption text associated with the speech sounds of the audio data.

13. The computer program product of claim 12 wherein the non-transitory computer readable storage medium has further instructions that cause the processor to:
  input the plurality of segments of the audio data into a speech classifier for classification, wherein the speech classifier generates a set of raw scores representing likelihoods that respective segments include occurrences of a speech sound;
  generate binary scores for the audio data based on the set of raw scores, wherein one of the binary scores is generated based on an aggregation of raw scores from consecutive series of the segments of the audio data; and
  generate a timing window for one or more of the speech sounds in the audio data based on the binary scores, wherein the timing window indicates the estimate of a beginning time and an ending time of the one or more in the audio data.

14. The computer program product of claim 13, wherein the non-transitory computer readable storage medium has further instructions that cause the processor to:
  divide the audio data into the plurality of segments, each segment being of a particular duration and offset from a start of the audio data;
  use a filter model to filter an audio signal of each of the plurality of segments to generate an output with multiple frequency channels;
  identify features based on the output of the filter model; and
  input the features into a machine learning model, the machine learning model used to determine a raw score indicating a likelihood of the occurrence of the speech sound in the segment of the audio data.

15. The computer program product of claim 13, wherein the non-transitory computer readable storage medium has further instructions, that cause the processor to:
  apply an aggregation function to raw scores of the consecutive series of the segments of the audio data;
  generate a plurality of aggregate values based on output of the aggregation function, each of the plurality of aggregate values being associated with one of the consecutive series of segments; and
  generate the binary scores based on the aggregate values, each binary score generated based on whether a corresponding aggregate value exceeds a threshold value.

16. The computer program product of claim 13, wherein the user interface element comprises one or a plurality of caption boxes, and the non-transitory computer readable storage medium has further instructions, that when executed by a processor, cause the processor to:
  generate the plurality of caption boxes for the audio stream, each caption box having a start and end timestamp corresponding with the start and end timestamps of a generated timing window; and
  store the plurality of caption boxes, wherein the caption boxes are configured to allow users to enter caption text in the caption boxes.

17. A system, comprising:
  a memory; and
  a processing device, coupled to the memory, wherein the processing device is to:
    access audio data comprising a plurality of segments;
    determine that one or more of the plurality of segments comprise speech sounds;
    identify a time duration for the speech sounds; and
    provide a user interface element corresponding to the time duration for the speech sounds, wherein the user interface element indicates an estimate of a beginning and ending of the speech sounds and is configured to receive caption text associated with the speech sounds of the audio data.

18. The system of claim 17, wherein the processing device is further to:
  input the plurality of segments of the audio data into a speech classifier for classification, wherein the speech classifier generates a set of raw scores representing likelihoods that respective segments include occurrences of a speech sound;
  generate binary scores for the audio data based on the set of raw scores, wherein one of the binary scores is generated based on an aggregation of raw scores from consecutive series of the segments of the audio data; and
  generate a timing window for one or more of the speech sounds in the audio data based on the binary scores, wherein the timing window indicates the estimate of a beginning time and an ending time of the one or more speech sounds in the audio data.

19. The system of claim 18, wherein the processing device is further to:
  divide the audio data into the plurality of segments, each segment being of a particular duration and offset from a start of the audio data;
  use a filter model to filter an audio signal of each of the plurality of segments to generate an output with multiple frequency channels;
  identify features based on the output of the filter model; and input the features into a machine learning model, the machine learning model used to determine a raw score indicating a likelihood of the occurrence of the speech sound in the segment of the audio data.

20. The system of claim 18, wherein the processing device is further configured to:
apply an aggregation function to raw scores of the consecutive series of the segments of the audio data;
generate a plurality of aggregate values based on output of the aggregation function, each of the plurality of aggregate values being associated with one of the consecutive series of segments; and
generate the binary scores based on the aggregate values, each binary score generated based on whether a corresponding aggregate value exceeds a threshold value.

* * * * *